United States Patent
Napoli et al.

(10) Patent No.: US 11,349,287 B2
(45) Date of Patent: *May 31, 2022

(54) CONDUIT FITTING

(71) Applicant: GREASE FIRE BEGONE LLC, Peoria, IL (US)

(72) Inventors: Joseph R. Napoli, Peoria, IL (US); Charles A. Shockency, Canton, IL (US)

(73) Assignee: GREASE FIRE BEGONE LLC, Peoria, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/464,288

(22) Filed: Sep. 1, 2021

(65) Prior Publication Data
US 2021/0399534 A1 Dec. 23, 2021

Related U.S. Application Data

(63) Continuation of application No. 16/709,067, filed on Dec. 10, 2019, now Pat. No. 11,114,826.

(51) Int. Cl.
| | |
|---|---|
| H02G 3/04 | (2006.01) |
| A62C 3/16 | (2006.01) |
| F16L 5/04 | (2006.01) |

(52) U.S. Cl.
CPC ............. *H02G 3/0412* (2013.01); *A62C 3/16* (2013.01); *F16L 5/04* (2013.01)

(58) Field of Classification Search
CPC ...... A62C 3/16; F16L 5/04; F16L 5/06; F16L 9/14; H02G 3/0412
See application file for complete search history.

(56) References Cited

U.S. PATENT DOCUMENTS

| | | | | |
|---|---|---|---|---|
| 3,602,865 A | * | 8/1971 | Milligan | F24C 7/08 337/411 |
| 4,356,870 A | * | 11/1982 | Gaylord | A62C 3/006 169/65 |
| 4,524,835 A | * | 6/1985 | Mingrone | A62C 3/04 138/37 |
| 4,580,638 A | * | 4/1986 | Jones | A62C 3/04 169/49 |
| 4,630,415 A | * | 12/1986 | Attwell | F16L 5/04 52/321 |

(Continued)

FOREIGN PATENT DOCUMENTS

| | | | | |
|---|---|---|---|---|
| DE | 102010007046 A1 | * | 8/2011 | ............... F16L 5/04 |
| EP | 0397008 | | 11/1990 | |
| JP | S4819831 | | 3/1973 | |

OTHER PUBLICATIONS

Search Report cited in Application No. GB 2019461.9 dated Apr. 20, 2021.

(Continued)

*Primary Examiner* — Babajide A Demuren
(74) *Attorney, Agent, or Firm* — DLA Piper LLP (US)

(57) ABSTRACT

A conduit fitting is provided herein. The conduit fitting may be configured to couple to an electrical mechanical tubing (EMT) often used in a fire suppression system. The conduit fitting may include a first cylindrical section and a second conical section. The first cylindrical section and the second conical section can both include a slit extending partially through the conduit fitting.

18 Claims, 7 Drawing Sheets

(56) References Cited

U.S. PATENT DOCUMENTS

| | | | | |
|---|---|---|---|---|
| 4,724,858 | A * | 2/1988 | Cornwall | F16L 5/04 |
| | | | | 137/362 |
| 5,127,479 | A * | 7/1992 | Stehling | A62C 3/006 |
| | | | | 169/16 |
| 5,645,128 | A * | 7/1997 | Schwall | A62C 37/44 |
| | | | | 16/48.5 |
| 6,409,179 | B1 * | 6/2002 | Daoud | F16L 5/06 |
| | | | | 277/602 |
| 6,449,865 | B1 * | 9/2002 | Heckman | G01F 23/04 |
| | | | | 33/726 |
| 9,702,487 | B2 * | 7/2017 | Rose, Jr. | F16L 9/14 |
| 2007/0246234 | A1 | 10/2007 | Vegso | |
| 2008/0141486 | A1 * | 6/2008 | Goates | F24F 13/1426 |
| | | | | 16/48.5 |
| 2011/0147017 | A1 * | 6/2011 | Saglam | A62C 3/07 |
| | | | | 169/62 |
| 2011/0186168 | A1 | 8/2011 | Rose, Jr. | |

OTHER PUBLICATIONS

Kaiser, Aug. 2011, Machine Translate of DE102010007046A1.
U.S. Appl. No. 16/709,067, filed Dec. 10, 2019 (Dec. 10, 2019 to Present).
U.S. Appl. No. 16/709,067, U.S. Pat. No. 11,114,826, filed Aug. 18, 2021, Patented.

* cited by examiner

CONDUIT FITTING

CROSS-REFERENCE TO RELATED APPLICATIONS

This application is a Continuation Application of U.S. patent application Ser. No. 16/709,067, filed Dec. 10, 2019, which is incorporated by reference in its entirety.

BACKGROUND

Embodiments disclosed herein relate to a fire suppression system configured to be activated manually or automatically. More specifically, the embodiments disclosed herein relate to a conduit fitting configured to couple to an electrical mechanical tubing (EMT) in the fire suppression system.

Fire suppression systems are commonly used to protect commercial buildings where flammable liquids are present. Fire suppression systems are most commonly found in restaurants where cooking units, such as grills and deep-fryer units, are being used. The grease used in the deep-fryer units and on the grills can pose a significant fire hazard.

Typically, these fire suppression systems use electrical metal tubing ("EMT") conduit sections and corner pulleys to route a cable between a control unit and a mechanical device, such as a remote pull station or fusible link. The EMT conduit sections and pulleys allow the cable to be routed around objects and corners while allowing the cable to move along its length inside of the EMT conduit sections between the mechanical device and the control unit. However, the cable is exposed at the corners to dirt, grease, and other environmental conditions that can accumulate on the cable, causing jamming or a malfunction. This can cause loss of life, injury and millions of dollars in property damage. Due to the sensitivity of the cable, maintenance is often not pragmatic, resulting in a required replacement of the EMT conduit section. The cost of replacing the EMT conduit and the associated cable typically includes thousands of dollars.

Accordingly, there is a need and desire for a fire suppression system that is less prone to jamming or other malfunctions and easy to clean to meet industry standards.

SUMMARY

An exemplary conduit fitting is provided herein. The conduit fitting may be configured to couple to an electrical mechanical tubing (EMT). The conduit fitting may include an upper cylindrical section and a lower conical section. The upper cylindrical section and the lower conical section may both include a slit extending partially through the conduit fitting.

In one aspect, the upper cylindrical section and the lower conical section may be formed of a unibody structure. In an alternative embodiment, the upper cylindrical section and the lower conical section can be mated together via at least one of molding, welding, stamping, and extrusion. The upper cylindrical section can include a diameter dimensioned to receive at least a portion of the EMT connector. In some embodiments, the upper cylindrical section includes a top surface configured to mate to the EMT connector.

In some embodiments, the upper cylindrical section includes a threaded receiving element configured to receive a threaded securing element of the EMT connector. The lower conical section can include an inner conical surface slanted at an angle between twenty and eighty degrees. In some embodiments, the slit is configured to receive a portion of a fusible link line passing therethrough. In some embodiments, the slit includes a first slit section in the upper cylindrical section, a second slit section in the lower conical section, and an aperture located at a vertex of the lower conical section.

A fire suppression system is also provided. The fire suppression system includes a control system including a storage container containing a fire suppression agent, and a protected area including an exhaust duct and an exhaust hood. The protected area includes conduits extending from the control system. The fire suppression system also includes at least one fusible link system positioned on at least one conduit. The fusible link system includes an electrical mechanical tubing (EMT) connector and a conduit fitting configured to couple to the EMT connector. The conduit fitting includes an upper cylindrical section and a lower conical section. The upper cylindrical section and the lower conical section may each include a slit extending partially through the conduit fitting.

In one aspect, the upper cylindrical section and the lower conical section in the fire suppression system may be formed of a unibody structure. In an alternative embodiment, the upper cylindrical section and the lower conical section in the fire suppression system can be mated together via at least one of molding, welding, stamping, and extrusion. The upper cylindrical section in the fire suppression system can include a diameter dimensioned to receive at least a portion of the EMT connector. In some embodiments, the upper cylindrical section in the fire suppression system includes a top surface configured to mate to the EMT connector.

In some embodiments, the upper cylindrical section in the fire suppression system includes a threaded receiving element configured to receive a threaded securing element of the EMT connector. The lower conical section in the fire suppression system can include an inner conical surface slanted at an angle between twenty and eighty degrees. In some embodiments, the slit in the fire suppression system is configured to receive a portion of a fusible link line passing therethrough. In some embodiments, the slit includes a first slit section in the upper cylindrical section, a second slit section in the lower conical section, and an aperture located at a vertex of the lower conical section.

Additional features and advantages of the disclosure will be set forth in the description that follows, and in part, will be obvious from the description; or can be learned by practice of the principles disclosed herein. The features and advantages of the disclosure can be realized and obtained by means of the instruments and combinations particularly pointed out in the appended claims. These and other features of the disclosure will become fully apparent from the following description and appended claims or can be learned by the practice of the principles set forth herein.

BRIEF DESCRIPTION OF THE DRAWINGS

In order to describe the manner in which the above-recited and other advantages and features of the disclosure can be obtained, a more particular description of the principles described above will be rendered by reference to specific examples illustrated in the appended drawings. These drawings depict only example aspects of the disclosure and are therefore not to be considered as limiting of its scope. The principles are described and explained with additional specificity and detail through the use of the following drawings.

DETAILED DESCRIPTION OF THE PREFERRED EMBODIMENTS

The present disclosure is directed towards a conduit fitting. The conduit fitting is configured to couple to an electrical mechanical tubing (EMT), which may be part of a fire suppression system. In one or more embodiments, the conduit fitting may include an upper cylindrical section and a lower conical section. The upper cylindrical section and the lower conical section may both include a slit extending partially through the conduit fitting. The slit is configured to receive a portion of a fusible link line passing therethrough.

Figure 1:
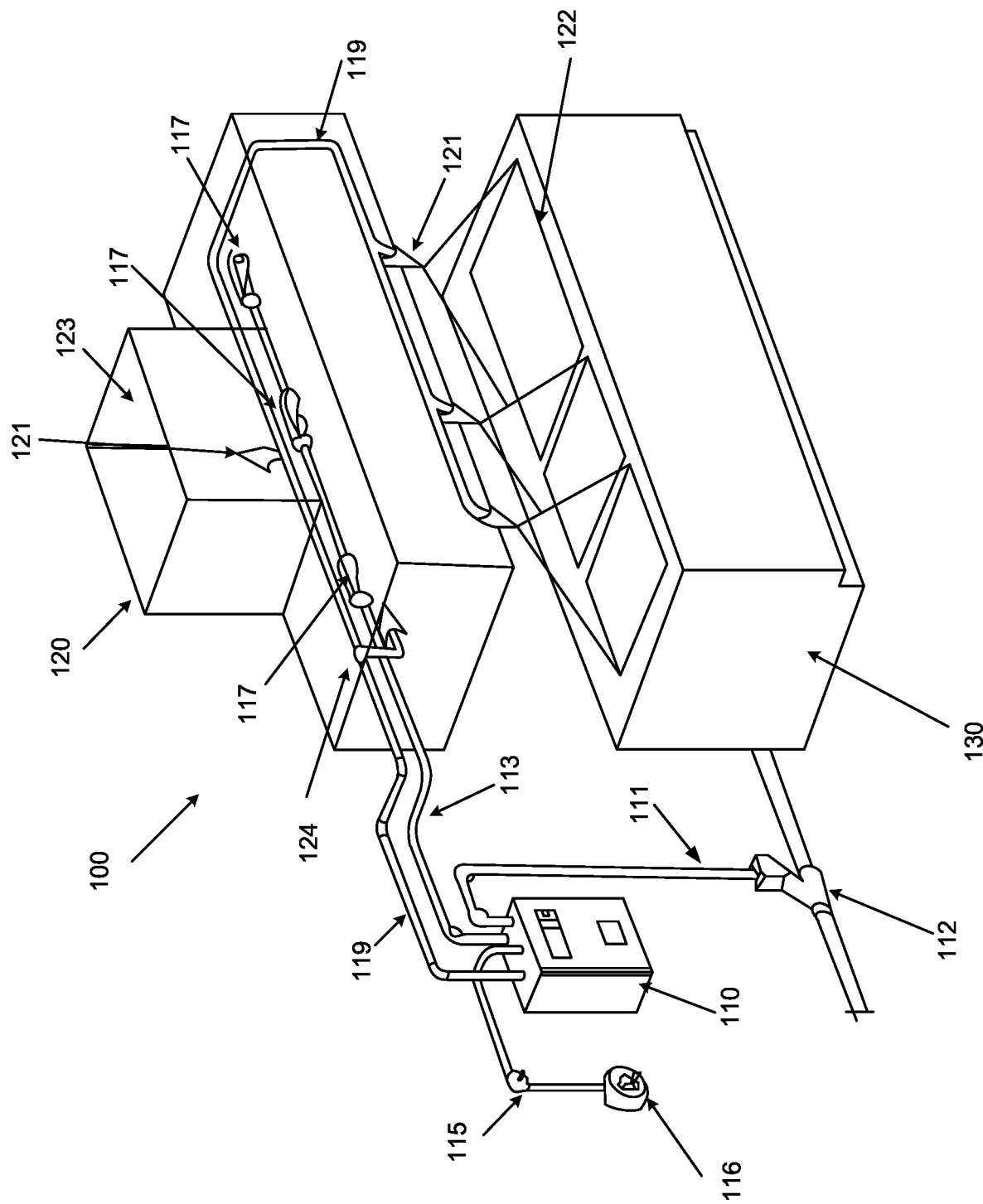
FIG. 1 is an exemplary fire suppression system, in accordance with an embodiment of the present disclosure.

FIG. 1 is an exemplary fire suppression system 100, in accordance with an embodiment of the present disclosure. The fire suppression system 100 can include a control system 110, a manual pull station 116, a protected area 120, and a cooking unit 130. The protected area 120 can include an exhaust duct 123 and an exhaust hood 124 connected in a conventional manner. The control system 110 can include, for example, a storage container (not shown) encompassing a fire suppression agent. The control system 110 can include multiple conduits extending therefrom. As used herein, the term "conduit" refers to any tube-like mechanism, such as piping, or electrical metal tubing (EMT). In some examples, the piping can be configured to deliver a fire suppression agent to the protected area 120 and or pass a shielded cable therethrough.

A first conduit 115 can extend from the control system 110 to the manual pull station 116. The first conduit 115 houses a shielded cable (not shown). The manual pull station 116 can be positioned on a wall remote of the control system 110. The manual pull station 116 has an actuator, such as a button or lever, for manually actuating the control system 110.

A second conduit 119 can extend from the control system 110 to a plurality of nozzles 121 for spraying the fire suppression agent onto a fire hazard area 122 on the cooking unit 130. As shown, the nozzles 121 can be positioned in the exhaust hood 124 above the cooking unit 130. An additional nozzle 121 is positioned for spraying fire suppression agent into the exhaust duct 123 of the protected area 120. A third conduit 111 can extend from the control system 110 to a gas shutoff valve 112. The third conduit 111 can house a shielded cable (not shown) therethrough. A fourth conduit 113 extends from the control system 110 into the exhaust hood 124 of the protected area. The fourth conduit 113 can include multiple fusible link systems 117 connected in series under the exhaust hood 124.

Figure 2:
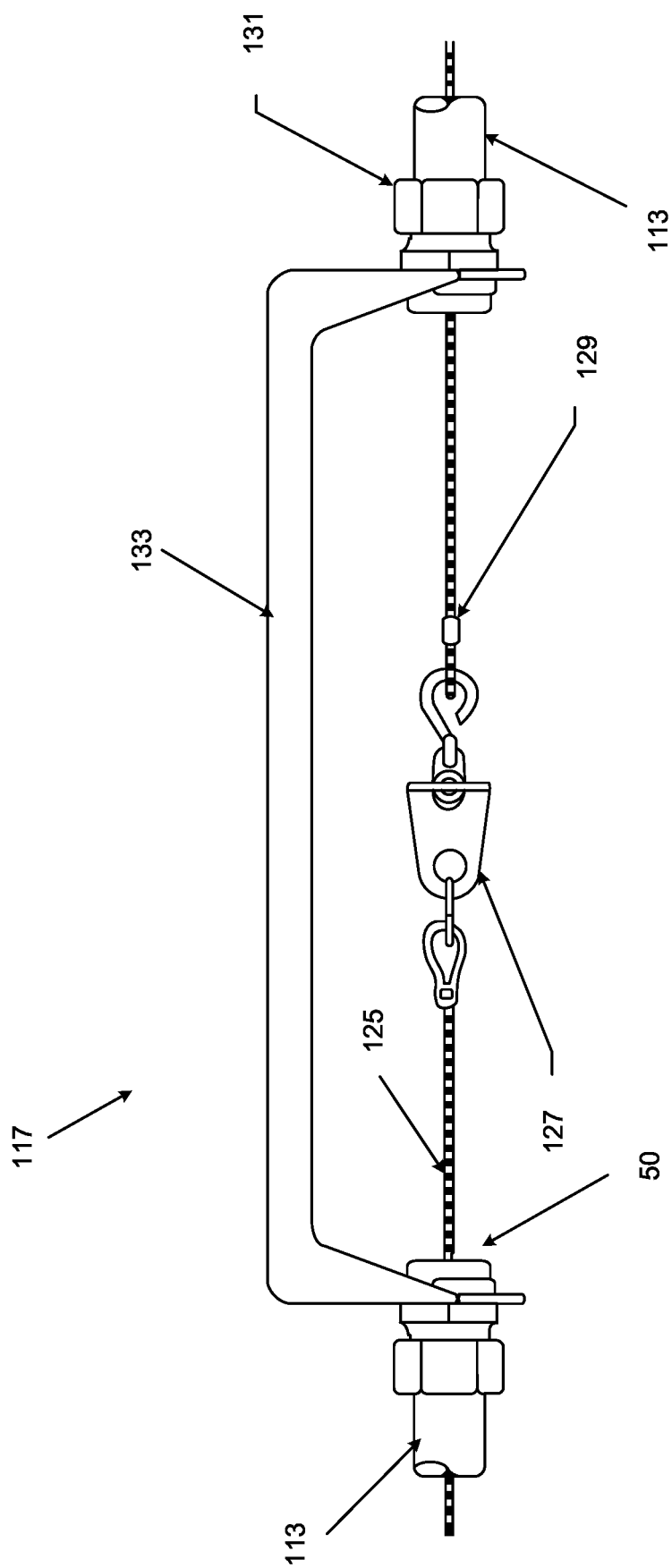
FIG. 2 is an exemplary fusible link detector implemented in the exemplary fire suppression system of FIG. 1, in accordance with an embodiment of the present disclosure.

FIG. 2 is an exemplary fusible link system 117 implemented in the exemplary fire suppression system 100 of FIG. 1, in accordance with an embodiment of the present disclosure. The fusible link system 117 may include two sections of the fourth conduit 113 secured by a link bracket 133. The fusible link system 117 may also include a fusible link line 125 extending from one section of the fourth conduit 113 to the other, a fusible link 127, and an EMT connector 131. The fusible link line 125 may be connected to the control system 110 under tension. In some embodiments, the fusible link line 125 can be secured within the control system 110 via a spring. The fusible link line 125 can include fusible link systems 117 connected in series under the exhaust hood 124 (shown in FIG. 1).

Within the fusible link system 117, the fusible link line 125 can extend from the fourth conduit 113 to the fusible link 127. The fourth conduit 113 can be connected to the link bracket 133 via the EMT connector 131. In some cases, the fusible link line 125 can be secured to the fusible link 127 via a cable crimp 129.

In a non-use state, the fusible link line 125 is maintained under tension, a valve on the storage container (not shown) encompassing the fire suppression agent is maintained in its normally closed state, and the gas shutoff valve 112 (shown in FIG. 1) is maintained in a normally open state. Referring to FIG. 1, when a fire occurs, the fire suppression system 100 is activated by either the manual pull station 116 or one of the fusible links 127 separating. The manual pull station 116 allows an individual to manually activate the fire suppression system 100 by pushing or pulling the actuator. The actuator moves the core of the shielded cable within the first conduit 115, causing the fire suppression agent to flow through the second conduit 119 and out of the nozzles 121 to extinguish the fire.

If the manual pull station 116 is not used, the fusible links 127 will separate upon reaching a specified temperature, releasing the tension on the fusible link line 125 thereby causing the fire suppression agent to flow through the second conduit 119 and out of the nozzles 121 to extinguish the fire. When the process is initiated by either the manual pull station 116 or the fusible link line 125, the control system 110 actuates the shielded cable within the third conduit 111, thereby closing the gas shutoff valve 112 to stop the flow of gas to the cooking unit 130. The fire suppression system 100 is susceptible to mechanical failure as a result of failing to provide regular maintenance, creating significant danger to its occupants.

In today's fire suppression system, the EMT connector 131 is open to allow the fusible link line 125 to pass therethrough into the fourth conduit 113, subsequently exposing the inside of the fourth conduit 113 to atmospheric conditions under the exhaust hood 124. It is common for the fourth conduit 113 to have grease buildup, leading to a short life cycle of the fourth conduit 113. As discussed below, the present disclosure provides a conduit fitting configured to couple to the EMT connector 131 to substantially mitigate the amount of grease that can build up on the inside of the conduit 113, while still allowing the fusible link line 125 to pass therethrough to keep the fire suppression system operational.

Figure 3:
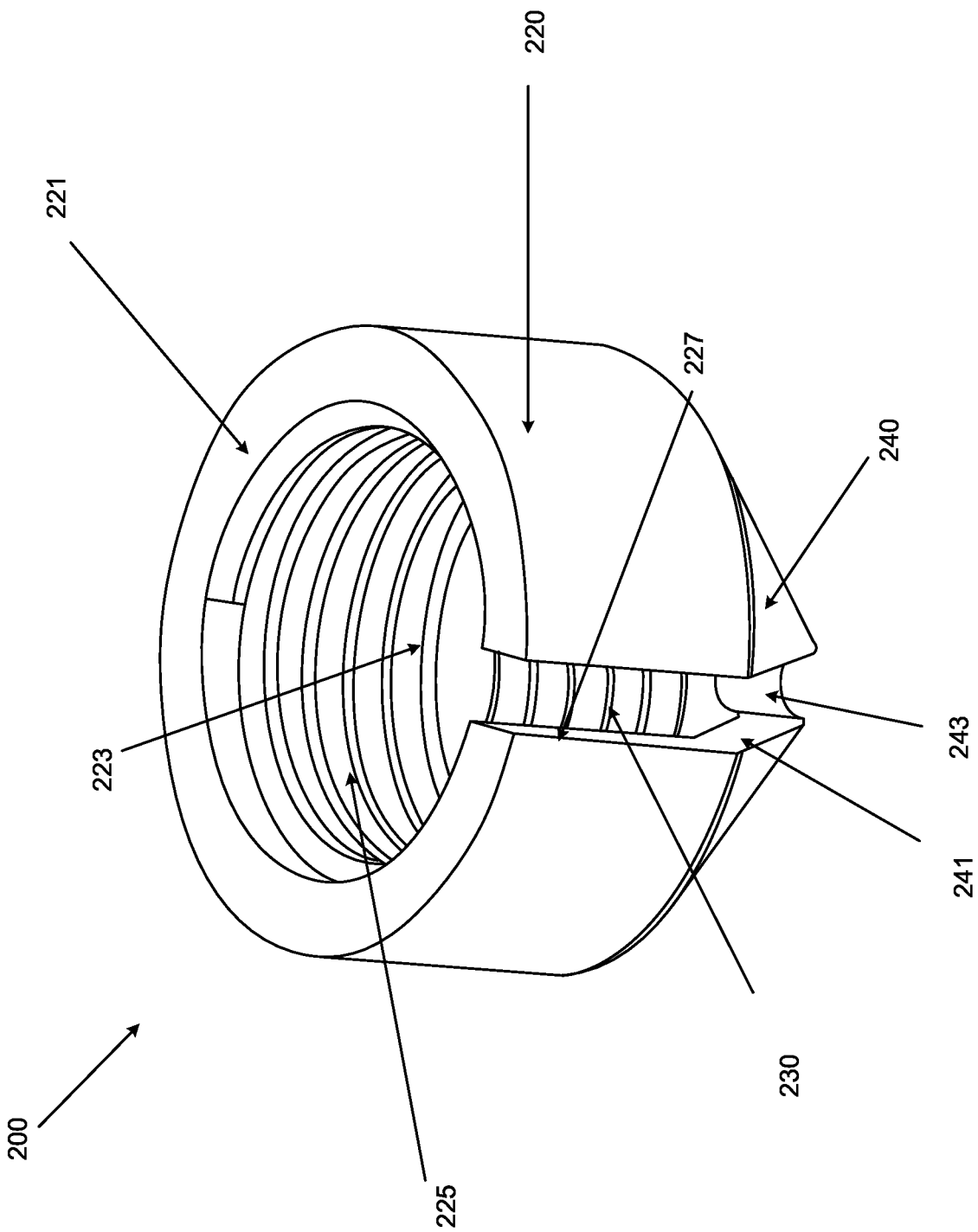
FIG. 3 is a front isometric view of a conduit fitting configured to be implemented in the exemplary fusible link of FIG. 2, in accordance with an embodiment of the present disclosure.
Figure 4:
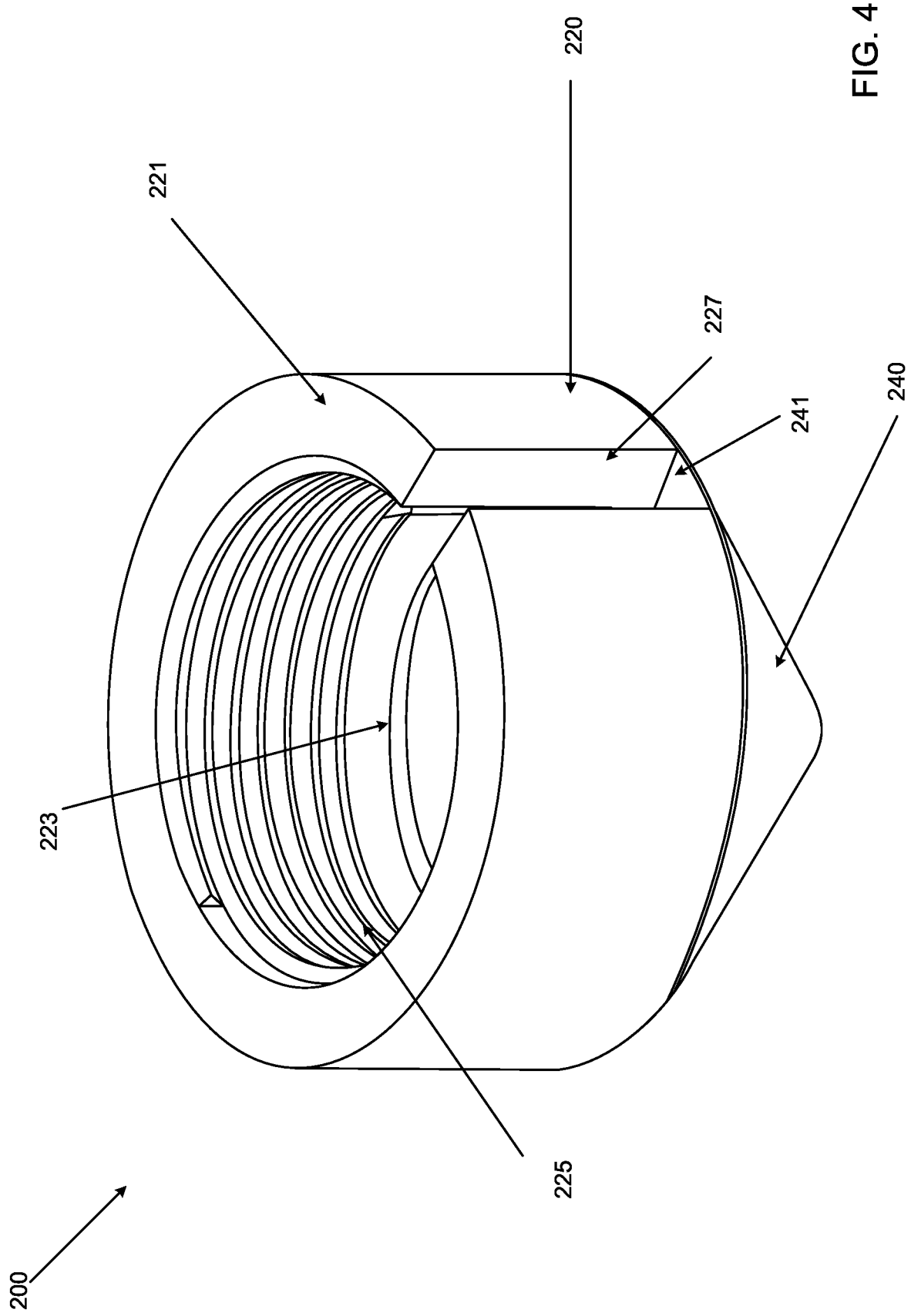
FIG. 4 is a top isometric view of the conduit fitting of FIG. 3, in accordance with an embodiment of the present disclosure.

FIG. 3 is a front isometric view of a conduit fitting 200 configured to couple to the EMT connector 131 in the fusible link system 117, in accordance with an embodiment of the present disclosure. FIG. 4 is a top isometric view of the conduit fitting 200. The conduit fitting 200 can include an upper cylindrical section 220 and a lower conical section 240. The conduit fitting 200 can be made up of stainless steel, sheet metal, or any other suitable material able to withstand varying temperatures and efficiently manufactured. In some embodiments, the conduit fitting may be zinc coated to prevent corrosion.

Both the upper cylindrical section 220 and the lower conical section 240 can include a slit 230 extending partially through the conduit fitting 200. In some embodiments, the upper cylindrical section 220 and the lower conical section 240 are formed of a unibody structure. In alternative embodiments, the upper cylindrical section 220 and the lower conical section 240 can be mated together via molding, welding, stamping, extrusion, or any other available shaping process.

The upper cylindrical section 220 can be formed with a diameter sized in accordance with the size of a threaded mating portion of the EMT connector of FIG. 2. The upper cylindrical section 220 can have a top surface 221 configured to mate to the EMT connector, and a threaded receiving element 225. The threaded receiving element 225 is configured to receive a threaded securing element (not shown) of the EMT connector 131.

Referring momentarily to FIG. 4, the lower conical section 240 can include an inner conical surface 245. In one embodiment, the threaded receiving element 225 can be separated from the inner conical surface 245 by a notch 223. The conduit fitting 200 is configured to receive the threaded securing element (not shown) of the EMT connector. The EMT connector is configured to be advanced into the conduit fitting towards the notch 223. The inner conical surface 245 need not be threaded.

However, in some embodiments, the inner conical surface 245 can be threaded. The slit 230 allows for the passage of the fusible link line to the fusible link (of FIG. 2). The slit 230 can be made up of a first slit section 227 in the upper cylindrical section 220, a second slit section 241 in the lower conical section 240, and an aperture 243 located at a vertex of the lower conical section 240. The aperture 243 can be dimensioned to account for the configuration of the fusible link line passing therethrough. The aperture 243 slit sections 227, 241 may allow the fitting 200 to be screwed onto the conduit 113, yet still receive the fusible link.

Figure 5:
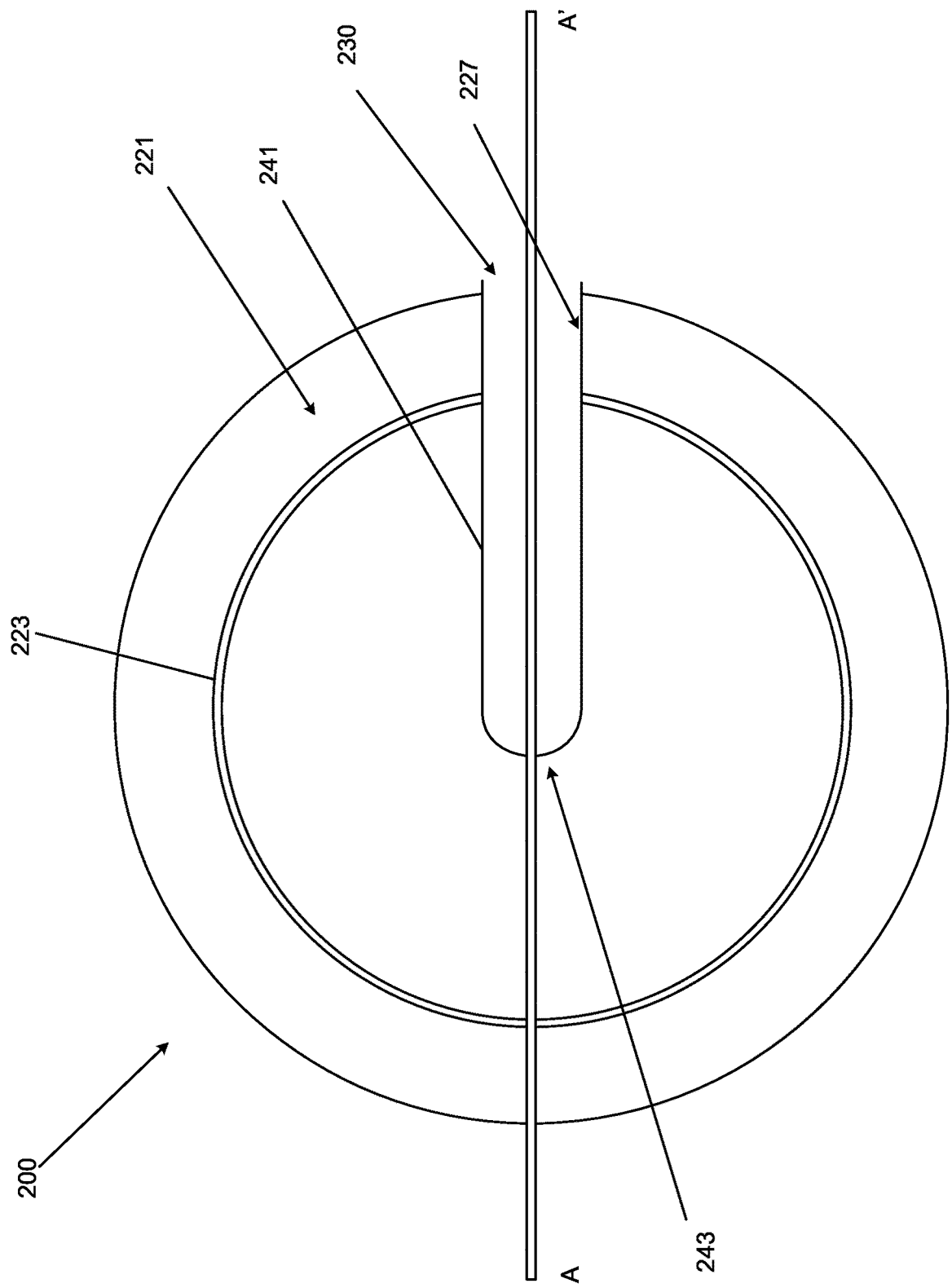
FIG. 5 is a top plan of the conduit fitting, in accordance with an embodiment of the present disclosure.
Figure 6:
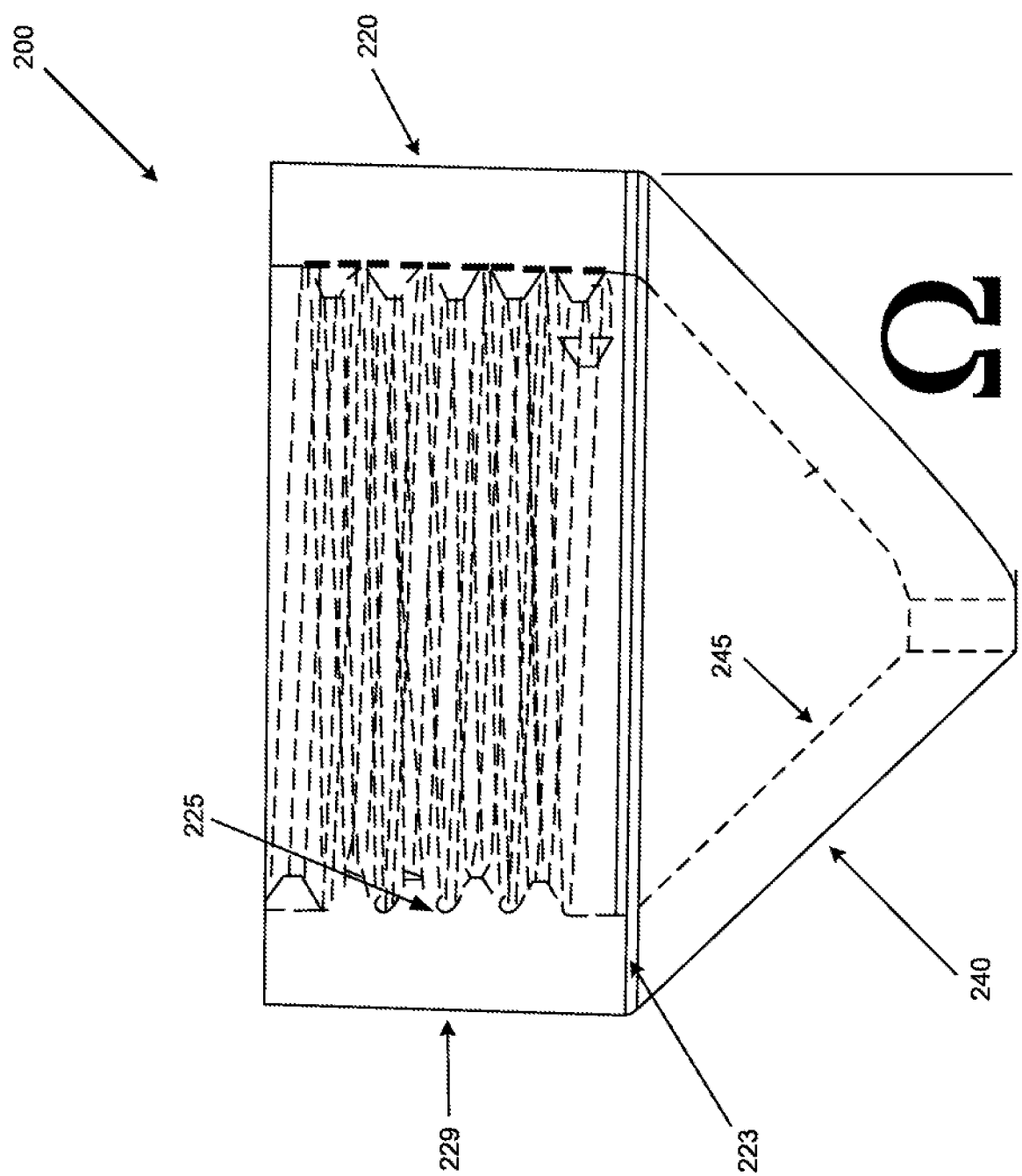
FIG. 6 is a cross-sectional view of the conduit fitting of FIG. 3, in accordance with an embodiment of the present disclosure.

In some embodiments, the slit 230 extends slightly beyond halfway through the conduit fitting 200 to account for the fusible link line passing through its true center. FIG. 5 is a top plan view of the conduit fitting 200, including cross-sectional line A-A'. FIG. 6 is a cross-sectional view of the conduit fitting 200 taken at cross-sectional line A-A'. The lower conical section 240 can be sloped at angle Ω. In some embodiments, angle Ω can be between 20-80 degrees. In some specific embodiments, the angle Ω is 45 degrees.

Figure 7:
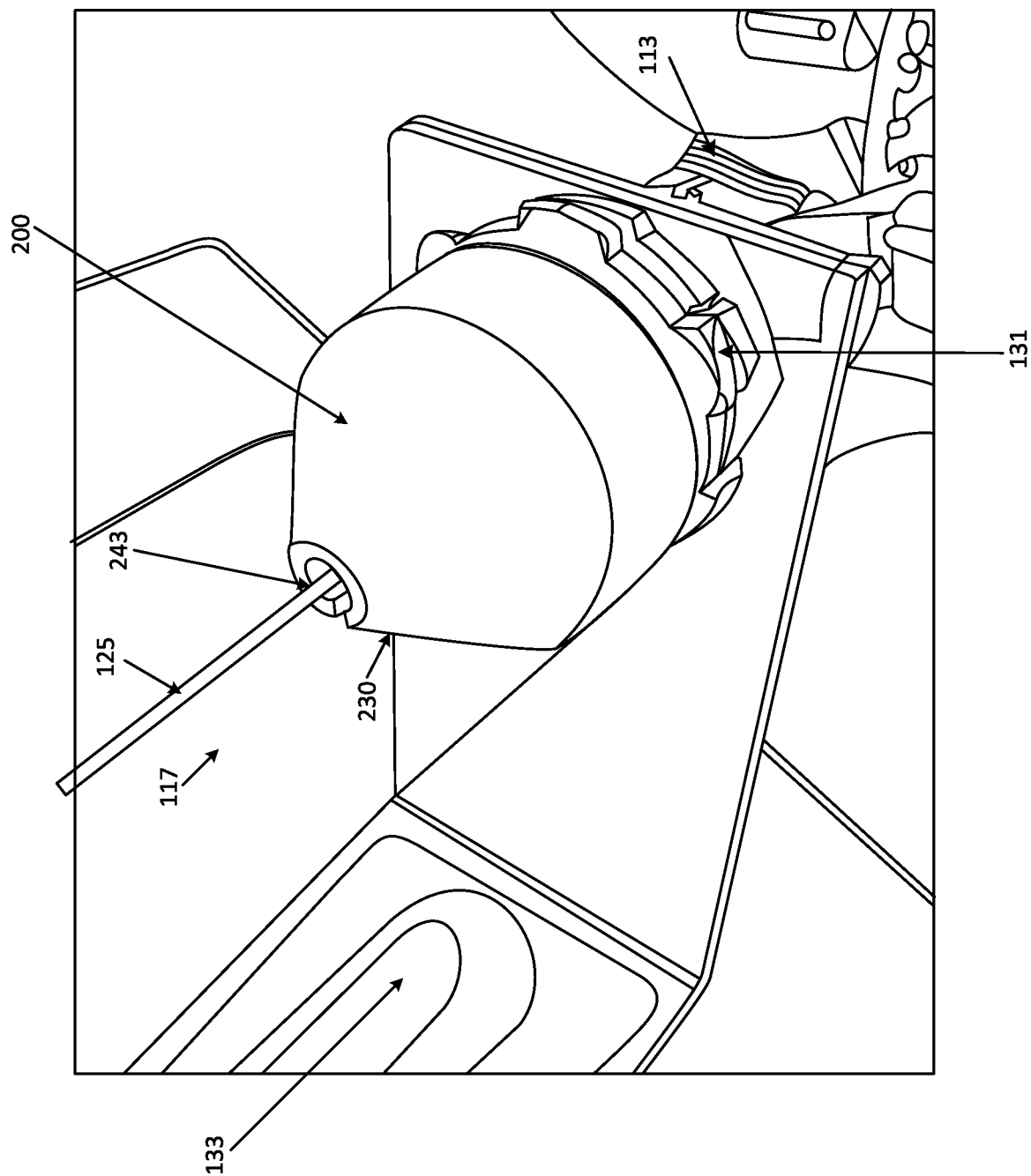
FIG. 7 is a front isometric view of the conduit fitting in the exemplary fusible link detector of FIG. 2, in accordance with an embodiment of the present disclosure.

FIG. 7 is a front isometric view of the conduit fitting 200 in the exemplary fusible link system 117, in accordance with an embodiment of the present disclosure. The threaded receiving element (225, shown in FIG. 6) of the conduit fitting 200 may be configured to receive a threaded securing element (not shown) of the EMT connector 131.

The conduit fitting 200 prolongs the life cycle of the conduit section it is affixed to. The conduit fitting 200 may be mated onto the EMT connector 131, which is fixed to the fourth conduit 113. The slit 230 of the conduit fitting 200 allows for passage of the fusible link line 125 therethrough. The fourth conduit 113 and the fusible link line 125 are no longer exposed at the corners to dirt, grease, and other environmental conditions that typically accumulate on the cable, causing jamming or a malfunction. As a result, the conduit fitting 200 can prolong the lifecycle of the fourth conduit 113.

The conduit fitting 200 provides an effective and efficient approach for maintaining the effectiveness of the fire suppression system 100. For example, the conduit fitting 200 only requires minimal maintenance every six to twelve months to ensure the fusible link line 125 can freely move through the slit 230 without hindrance, in order to activate the fire suppression system 100 in the event of a fire. Over a sixth month period, the conduit fitting 200 may prevent up to ninety percent of the grease out of the fourth conduit 113 that houses the fusible link line 125. Moreover, when the slit 230 is positioned upwards, in the opposite direction of a cooking unit, the conduit fitting 200 can prevent more than ninety-three percent of the dirt, grease, or other environmental conditions from accumulating at the opening of the fourth conduit 113.

While various embodiments have been described above, it should be understood that they have been presented by way of example and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. For example, other steps may be provided, or steps may be eliminated, from the described flows, and other components may be added to, or removed from, the described systems. Accordingly, other implementations are within the scope of the following claims.

In addition, it should be understood that any figures which highlight the functionality and advantages are presented for example purposes only. The disclosed methodology and system are each sufficiently flexible and configurable such that they may be utilized in ways other than that shown.

Although the term "at least one" may often be used in the specification, claims and drawings, the terms "a", "an", "the", "said", etc. also signify "at least one" or "the at least one" in the specification, claims and drawings.

Finally, it is the applicant's intent that only claims that include the express language "means for" or "step for" be interpreted under 35 U.S.C. 112(f). Claims that do not expressly include the phrase "means for" or "step for" are not to be interpreted under 35 U.S.C. 112(f).

What is claimed is:

1. A conduit fitting configured to couple to an electrical mechanical tubing (EMT) connector within a fire suppression system, the conduit fitting comprising:
   a first cylindrical section comprising a threaded receiving element configured to receive a threaded securing element of the EMT connector; and
   a second conical section, the first cylindrical section and the second conical section both including a slit extending partially through the conduit fitting.

2. The conduit fitting of claim 1, wherein the first cylindrical section and the second conical section are formed of a unibody structure.

3. The conduit fitting of claim 1, wherein the first cylindrical section and the second conical section are mated together via at least one of molding, welding, stamping, or extrusion.

4. The conduit fitting of claim 1, wherein the first cylindrical section comprises a diameter dimensioned to receive at least a portion of the EMT connector.

5. The conduit fitting of claim 1, wherein the first cylindrical section includes a top surface configured to mate to the EMT connector.

6. The conduit fitting of claim 1, wherein the second conical section includes an inner conical surface slanted at an angle between twenty and eighty degrees.

7. The conduit fitting of claim 1, wherein the slit is configured to receive a portion of a fusible link line passing therethrough.

8. The conduit fitting of claim 1, wherein the slit includes a first slit section in the first cylindrical section, a second slit section in the second conical section, and an aperture located at a vertex of the second conical section.

9. A fire suppression system comprising:
- a control system including a storage container containing a fire suppression agent;
- a protected area including an exhaust duct and an exhaust hood, the protected area including a plurality of conduits extending from the control system; and
- at least one fusible link system positioned on at least one conduit of the plurality of conduits, the at least one fusible link system including an electrical mechanical tubing (EMT) connector and a conduit fitting configured to couple to the EMT connector, the conduit fitting comprising:
    - a first cylindrical section comprising a threaded receiving element configured to receive a threaded securing element of the EMT connector; and
    - a second conical section, the first cylindrical section and the second conical section includes a slit extending partially through the conduit fitting.

10. The fire suppression system of claim 9, wherein the first cylindrical section and the second conical section are formed of a unibody structure.

11. The fire suppression system of claim 9, wherein the first cylindrical section and the second conical section are mated together via at least one of molding, welding, stamping, or extrusion.

12. The fire suppression system of claim 9, wherein the first cylindrical section is formed with a diameter dimensioned to receive at least a portion of the EMT connector.

13. The fire suppression system of claim 9, wherein the first cylindrical section includes a top surface configured to mate to the EMT connector.

14. The fire suppression system of claim 9, wherein the second conical section includes an inner conical surface slanted at an angle between twenty and eighty degrees.

15. The fire suppression system of claim 9, wherein the at least one conduit of the plurality of conduits includes a fusible link line passing therethrough,
    wherein the slit is configured to receive a portion of the fusible link line passing therethrough.

16. The fire suppression system of claim 9, wherein the slit includes a first slit section in the first cylindrical section, a second slit section in the second conical section, and an aperture located at a vertex of the second conical section.

17. The fire suppression system of claim 9, further comprising a manual pull station mechanically connected to the control system.

18. The fire suppression system of claim 9, wherein at least one conduit of the plurality of conduits comprises a series of nozzles, each nozzle configured to spray the fire suppression agent onto at least one of a cooking unit and into the exhaust duct of the protected area.

* * * * *